US011085118B2

United States Patent
Drewniak et al.

(10) Patent No.: US 11,085,118 B2
(45) Date of Patent: Aug. 10, 2021

(54) COMPOSITION AND METHOD FOR INHIBITING CORROSION AND SCALE

(71) Applicant: NCH Corporation, Irving, TX (US)

(72) Inventors: Marta Drewniak, Carrollton, TX (US); Lyle H. Steimel, Flower Mound, TX (US)

(73) Assignee: NCH Corporation, Irving, TX (US)

( * ) Notice: Subject to any disclaimer, the term of this patent is extended or adjusted under 35 U.S.C. 154(b) by 0 days.

(21) Appl. No.: 15/634,416

(22) Filed: Jun. 27, 2017

(65) Prior Publication Data

US 2017/0306506 A1    Oct. 26, 2017

Related U.S. Application Data

(63) Continuation-in-part of application No. 15/273,158, filed on Sep. 22, 2016.
(Continued)

(51) Int. Cl.
| | | |
|---|---|---|
| *C23F 11/14* | (2006.01) | |
| *C23F 11/10* | (2006.01) | |

(Continued)

(52) U.S. Cl.
CPC .............. *C23F 11/144* (2013.01); *C02F 5/12* (2013.01); *C02F 5/14* (2013.01); *C23F 11/10* (2013.01);
(Continued)

(58) Field of Classification Search
None
See application file for complete search history.

(56) References Cited

U.S. PATENT DOCUMENTS

| | | |
|---|---|---|
| 2,333,206 A | 11/1943 | Sloan |
| 4,101,328 A | 7/1978 | Fieser et al. |
| | (Continued) | |

FOREIGN PATENT DOCUMENTS

| | | |
|---|---|---|
| CA | 2252044 | 10/1997 |
| CN | 0N1603252 | 4/2005 |
| | (Continued) | |

OTHER PUBLICATIONS

Reclamation ("Water Chemistry Analysis for Water Conveyance, Storage, and Desalination Projects", 2013, pp. 1-14). (Year: 2013).*
(Continued)

*Primary Examiner* — Clare M Perrin
(74) *Attorney, Agent, or Firm* — Scheef & Stone, LLP; Robin L. Barnes (57) ABSTRACT

A composition and method of inhibiting corrosion, white rust, and scale formation on components in a water system. The composition preferably comprises an amino-acid based polymer (most preferably a polyaspartic acid or a salt thereof), hydroxyphosphonoacetic acid, and a second phosphonic acid (preferably a phosphonocarboxylic acid), and does not require the use of regulated metals. The composition is effective even in the presence of biocides. A preferred method of inhibiting white rust comprises adding an amino-acid based polymer or hydroxyphosphonoacetic acid or both to the water system. A preferred method of inhibiting corrosion, white rust, and scale formation comprises adding an amino-acid based polymer, hydroxyphosphonoacetic acid, and a phosphonocarboxylic acid to the water system. Preferably the active concentrations are at least 3 ppm each of the amino-acid based polymer and hydroxyphosphonoacetic acid when added to a volume of water in the water system.

52 Claims, 4 Drawing Sheets

Related U.S. Application Data (60) Provisional application No. 62/363,574, filed on Jul. 18, 2016, provisional application No. 62/322,616, filed on Apr. 14, 2016.

(51) Int. Cl.
| | |
|---|---|
| *C23F 11/167* | (2006.01) |
| *C23F 11/173* | (2006.01) |
| *C02F 5/14* | (2006.01) |
| *C02F 5/12* | (2006.01) |
| C02F 103/02 | (2006.01) |
| C23F 14/02 | (2006.01) |

(52) U.S. Cl.
CPC ........ *C23F 11/167* (2013.01); *C23F 11/1676* (2013.01); *C23F 11/173* (2013.01); *C02F 2103/023* (2013.01); *C02F 2303/08* (2013.01)

(56) References Cited

U.S. PATENT DOCUMENTS

| | | | |
|---|---|---|---|
| 4,719,083 A | 1/1988 | Baker et al. | |
| 4,915,939 A | 4/1990 | Iwahashi | |
| 4,971,724 A | 11/1990 | Kalota et al. | |
| 5,062,962 A | 11/1991 | Brown et al. | |
| 5,120,661 A | 6/1992 | Baker et al. | |
| 5,242,602 A * | 9/1993 | Richardson ............ | G01N 21/31 210/143 |
| 5,294,371 A | 3/1994 | Clubley et al. | |
| 5,407,597 A | 4/1995 | Busch et al. | |
| 5,523,023 A * | 6/1996 | Kleinstuck ............. | C02F 5/12 252/180 |
| 5,525,257 A | 6/1996 | Kleinstuck et al. | |
| 5,531,934 A | 7/1996 | Freeman et al. | |
| 5,562,830 A | 10/1996 | Zidovec et al. | |
| 5,707,529 A | 1/1998 | Gill et al. | |
| 5,800,732 A | 9/1998 | Coughlin et al. | |
| 5,866,032 A * | 2/1999 | Carey ..................... | C02F 5/14 210/699 |
| 6,090,345 A | 7/2000 | Holzner et al. | |
| 6,183,649 B1 | 2/2001 | Fontana | |
| 6,207,079 B1 * | 3/2001 | Kmec ..................... | C02F 5/14 252/389.2 |
| 6,277,302 B1 | 8/2001 | Fan et al. | |
| 6,447,717 B1 | 9/2002 | Fan et al. | |
| 6,464,900 B1 | 10/2002 | Kmec et al. | |
| 6,468,470 B1 | 10/2002 | Oldsberg et al. | |
| 6,503,400 B2 | 1/2003 | Kmec et al. | |
| 6,572,789 B1 | 6/2003 | Yang et al. | |
| 6,585,933 B1 | 7/2003 | Ehrhardt et al. | |
| 6,646,082 B2 | 11/2003 | Ghosh et al. | |
| 6,814,930 B1 | 11/2004 | Oldsberg et al. | |
| 7,851,655 B2 | 12/2010 | Kidambi | |
| 7,910,024 B2 | 3/2011 | Stapp et al. | |
| 7,935,274 B2 | 5/2011 | Schlosser | |
| 8,496,847 B2 * | 7/2013 | Keister .................. | C02F 5/14 210/696 |
| 8,585,964 B2 | 11/2013 | Sotoudeh et al. | |
| 9,290,850 B2 | 3/2016 | Erickson et al. | |
| 2007/0001150 A1 | 1/2007 | Hudgens et al. | |
| 2010/0137174 A1 | 6/2010 | Maeda et al. | |
| 2010/0176060 A1 * | 7/2010 | Duarte ................... | C02F 5/083 210/696 |
| 2010/0178197 A1 | 7/2010 | Sotoudeh et al. | |
| 2013/0239991 A1 | 9/2013 | Denvir et al. | |
| 2015/0004054 A1 | 1/2015 | Richardson et al. | |
| 2015/0118103 A1 * | 4/2015 | Erickson ................ | C23F 11/08 422/7 |

FOREIGN PATENT DOCUMENTS

| | | | |
|---|---|---|---|
| CN | 1743282 | 3/2006 | |
| CN | 1743282 A * | 3/2006 | ............. C23F 11/08 |
| CN | 1273393 | 9/2006 | |
| CN | 1273393 C * | 9/2006 | ............. C23F 11/08 |
| CN | 102718333 | 10/2012 | |
| CN | 102838216 | 12/2012 | |
| CN | 103319010 | 9/2013 | |
| CN | 103319010 A * | 9/2013 | ............. C23F 14/02 |
| CN | 103710712 | 4/2014 | |
| CN | 0N105948283 | 9/2016 | |
| CN | 106315880 | 1/2017 | |
| EP | 0238728 | 12/1986 | |
| WO | W09401486 | 1/1994 | |
| WO | W09728231 | 8/1997 | |
| WO | W02017180328 | 10/2017 | |

OTHER PUBLICATIONS

Machine translation of CN-103319010A; pp. 1-8. (Year: 2013).*
Machine translation of CN-1273393C; pp. 1-10. (Year: 2006).*
Translation of CN-1743282A; see pp. 2-9 of combined original and translation document provided by Applicant. (Year: 2006).*
Koken, Mustafa Emrah, Comprehensive solutions for your water systems, published Sep. 2009 by BKG Water Solutions; retrieved from the internet on Dec. 14, 2016, http://www.hitech-envir.com/BKG_Water.pdf.
Chem-Aqua 31155 Material Safety Data Sheet, published Jun. 3, 2013 by Chem-Aqua, retrieved from the internet on Dec. 14, 2016, https://webpirs.nch.com/msds/msdsview.aspx?cn=CAN&co=AQ&gn=C777&sn=CHEM-AQUA+31155&in=en.
BK Giulini Safety Data Sheet on Cetamine V217S, published Sep. 27, 2010 by BK Giulini.
Cetamine V217 S Spec Sheet, BKG Water Solutions, published/revision Aug. 20, 2010 by BKG Water Solutions, bkgwater.com.
Betova et al. Film-Forming Amines in Steam/Water Cycles—structure, properties, and influence on corrosion and deposition processes. Research Report No. VTT-R 03234-14; published Jul. 7, 2014 by VTT Technical Research Centre of Finland.
CHEM-AQUA. Material Safety Data Sheet: CHEM-AQUA 15000 MT, Published Jul. 17, 2014 by Chem-Aqua; https://webpirs.nch.com/msds/msdsview.aspx?cn=USA&CA=CA&gn=775C&sn=CHEM-AQUA+F15000MT+&In=en.
Ochoa et al. The Synergistic Effect Between Phosphonocarboxylic Acid Salts and Fatty Amines for the Corrosion Protection of a Carbon Steel. Journal of Applied Electrochemistry vol. 34 Issue 5: 487-493, published May 2004 by Kluwer Academic Publishers, Netherlands.
BKG Water Solutions. Product Information Cetamine V217. Publication/revision date Dec. 3, 2009; retrieved fromThe internet on Dec. 14, 2016, http://www.burla.co.il/files/TDS_CETAMINE_V_217.pdf.
Karen, The Pursuit of a Green Carbon Steel Corrosion Inhibitor: Laying the Groundwork, Online Article retrieved from the internet on Aug. 18, 2016, published Nov. 8, 2014, pp. 1-16, US Water Services, Minnesota, USA; http//www.uswaterservices.com/new.com/2014/11/the-pursuit-of-a-green-carbon-steetl-corrosion-inhibitor-layaing-the-groundwork/.
Frayne, CWT, Aquassurance, Inc., Organic Water Treatment Inhibitors: Expansion of Current Guidelines, Myths, Disinformation, and the Next Generation of Novel Chemistries—Part II, Article, The Analyst, vol. 16, No. 4, pp. 24-33, published Fall 2009; retrieved from the internet on Dec. 14, 2016, https://www.cortecvci.com/Publications/Papers/Watertreatment/OrganicWTInhibitors.pdf.
Langelier and Aggressive Indices, 2014 [retrieved from the Internet: URL:https://stpnq.com/wp-content/uploads/2014/08/Langelier-index.pdf.

* cited by examiner

|  | Carbon Steel Coupon | |
|---|---|---|
| Test | Flow Rate = 3ft/sec | Flow rate = 5ft/sec |
| Control (no treatment) | | |
| Example 1 | | |
| Example 2 | | |
| Example 3 | | |
| Comp. Ex.4 | | |
| Comp. Ex.5 | | |
| Comp. Ex.6 | | |
| Comp. Ex.7 | | |
| Comp. Ex.8 | | |
| Comp. Ex.9 | | |

FIG. 1

| Test | Carbon Steel Coupon | |
|---|---|---|
| | Flow Rate = 3ft/sec | Flow rate = 5ft/sec |
| Example 2 |  |  |
| Example 3 |  |  |
| Comp. Ex. 4 |  |  |
| Comp. Ex. 7 |  |  |

| Test | Galvanized Coupon | |
|---|---|---|
| | Before Cleaning | After cleaning |
| Comp. Ex. 22 No Inhibitor | | |
| Comp. Ex. 23 | | |
| Example 24 | | |
| Example 25 | | |
| Example 26 | | |

*FIG. 4*

COMPOSITION AND METHOD FOR INHIBITING CORROSION AND SCALE

CROSS-REFERENCE TO RELATED APPLICATION

This application is a continuation-in-part of U.S. application Ser. No. 15/273,158 filed on Sep. 22, 2016, which claims the benefit of U.S. Provisional Application Ser. No. 62/322,616 filed on Apr. 14, 2016 and U.S. Provisional Application Ser. No. 62/363,574 filed on Jul. 18, 2016.

BACKGROUND OF THE INVENTION

1. Field of the Invention

This invention relates to a treatment composition and method for inhibiting corrosion or white rust on metal components in low LSI (Langelier Saturation Index) water systems and for inhibiting scale formation in high LSI water systems.

2. Description of Related Art

Various water treatment compositions are used to reduce corrosion, mineral scale, and white rust formation on metal components in contact with an aqueous solution in water systems such as open recirculating systems, closed loop cooling or heating systems, cooling towers and boilers, and help protect the metal components of these systems. The metals typically used in these water systems include ferrous metals, including galvanized steel, aluminum and its alloys, copper and its alloys, lead, and solder. Many known corrosion inhibitors contain regulated toxic metals, such as zinc, chromate, and molybdate, which are harmful to the environment and increase the costs. Zinc is typically used as corrosion inhibitor in water systems with highly corrosive water (low LSI). However its usage is undesirable due to toxicity issues and its use faces regulations in some locations. Tin has also been used as a non-toxic alternative to zinc, but it is more expensive.

The performance of many known corrosion and scale inhibitors is also negatively impacted by the use of biocides, which are frequently used in water systems to control the growth of microorganisms. The use of polyaspartic acid and a single phosphonic acid are disclosed in U.S. Pat. No. 5,523,023 as effective in inhibiting corrosion and scale, even in the presence of a biocide when the phosphonic acid is 2-phosphonobutane-1,2,4-tricarboxylic acid (PBTC). The preferred phosphonic acid in the '023 patent is PBTC, but other phosphonic acids, including 1-hydroxyethane 1,1-disphosphonic acid and hydroxyphosphonoacetic acid (HPA) are also mentioned as suitable. The corrosion rate results shown in the '023 patent based on the use of polyaspartic acid and PBTC are better than other corrosion inhibitors, but there is still a need for even greater corrosion inhibition, particularly in the presence of biocides. The scale formation results shown in the '023 patent based on the use of polyaspartic acid and PBTC are approximately the same as the results obtained by using PBTC alone, indicating no real improvement in scale inhibition is obtained with the two-component formula of the '023 patent.

Currently utilized solutions for white rust prevention include passivating the metal surfaces with zinc carbonate and control of water chemistry to reduce potential for white rust formation. Known treatments include the use of inorganic phosphates, thiocarbamates, organo-phosphorous compounds and tannins. For example, U.S. Pat. Nos. 5,407,597 and 6,468,470 disclose compositions comprising organophosphorus compounds (including PBTC), an alkali metal salt of molybdenum, titanium, tungsten, or vanadium, and either a carbamate compound or a tannin compound. U.S. Pat. No. 6,183,649 discloses a white-rust treatment composition comprising PBTC, sodium polyacrylate, sodium tolytriazole, an alkali metal molybdate, and an alkali metal bromide for treating circulating water systems. The '649 patent also discloses the addition of a 1.5% aqueous solution of decyl thioethyletheramine (DTEA) at a rate of 25lb/1,000 gallons of water/week to the circulating water system prior to adding the white rust treatment composition at a rate of 600 ppm per cycle for ten cycles of recirculation after addition of the DTEA.

There is a need for an effective all-in-one treatment composition and method that can be used to inhibit corrosion, white rust, and scale in a water system without the need for separate treatments, which may negatively interact with each other. There is also a need for an effective all-in-one treatment that is more environmentally friendly and capable of adequately performing in conjunction with biocides

SUMMARY OF THE INVENTION

According to one preferred embodiment of the invention, an improved corrosion inhibitor, white rust inhibitor, and scale inhibitor composition comprises an amino-acid based polymer (AAP), hydroxyphosphonoacetic acid (HPA) or its water soluble salt, and another phosphonic acid or its water soluble salt. Hydroxyphosphonoacetic acid has the following general structure:

Most preferably, the amino-acid based polymer is polyaspartic acid or its water soluble salt, but other compounds such as polyglycine acid, polyglutamic acid and their salts may also be used. Most preferably, the amino acid based polymer has the following formula:

where R1=H, R2=OH, and R3=COOH and x=1 for polyaspartic acid. Most preferably, the other phosphonic acid is a phosphonocarboxylic acid or any organic phosphonate may also be used. Most preferably, the phosphonocarboxylic acid is 1-hydroxyethane-1,1-diphosphonic acid (HEDP) or 2-phosphonobutene-1,2,4-tricarboxylic acid (PBTC) or phosphonosuccinic acid. Preferably the weight ratio of AAP to HPA in the inhibitor composition is 90:10 to 10:90 and the ratio of combined AAP and HPA to other phosphonic acid is in the range of 90:10 to 60:40. More preferably, the weight ratio range of AAP to HPA in the inhibitor composition is 80:20 to 80:20 and the ratio of combined AAP and HPA to other phosphonic acid is 80:20 to 70:30.

Most preferably, a composition according to a preferred embodiment of the invention is all organic and does not contain regulated metals such as zinc, chromate, and molybdate and its performance is not affected by addition of biocides. Most preferably, a composition according to a preferred embodiment of the invention does not contain tin.

It was previously known to use both HPA and AAP, such as polyaspartic acid, separately as corrosion inhibitors. It was also disclosed in the '023 patent that AAP could be used together with phosphonocarboxylic acid to inhibit corrosion and scale, but it was not previously known to use AAP and HPA together along with another phosphonic acid, preferably a phosphonocarboxylic acid, or an organic phosphonate to inhibit corrosion or scale.

When added to the water in the water system being treated, a preferred composition according to the invention for inhibiting corrosion yields at least 3 ppm active AAP, at least 3 ppm active HPA, and at least 2 ppm of the other phosphonic acid. More preferably, when added to the water in the water system being treated, a preferred composition yields 3 ppm-50 ppm AAP, 3 ppm-50 ppm HPA, and 2 ppm-20 ppm of the other phosphonic acid and most preferably between 5 ppm-30 ppm AAP, 3 ppm-20 ppm HPA, and 2 ppm-10 ppm of the other phosphonic acid. Additionally, the combined total of the three components of a preferred composition yields at least 8 ppm active corrosion inhibitors when added to the water being treated. These ingredients have the unexpected synergistic effect of improved corrosion inhibition in low LSI water systems (LSI<−0.5) without requiring the use of toxic metals and without being adversely impacted by biocides.

In addition to unexpected and synergistic effect of the inhibitor composition on ferrous metal corrosion inhibition in low LSI water, the same composition also has a positive effect on preventing formation of white rust on galvanized steel. Galvanized steel consists of a thin coating of zinc fused to a steel substrate. White rust is a rapid, localized corrosion attack on zinc that usually appears as a voluminous white deposit. This rapid corrosion can completely remove zinc in a localized area with the resultant reduction in equipment life. White rust formation tends to increase with increased alkalinity levels in the water. Neither hydroxyphosphonoacetic acid nor amino-acid based polymers, such as polyaspartic acid, alone or in combination, has been previously utilized in commercial products for white rust prevention. Without being bound by theory, it is believed that the compositions according to the invention may be forming a protective layer on the surface of galvanized steel and reduce white rust formation. For treating white rust according to the invention, it is preferred to use hydroxyphosphonoacetic acid, an amino-acid based polymer, and another phosphonic acid in the amounts indicated above for inhibiting corrosion (both weight ratios and concentrations when added to the water in the water system being treated), but it has also been found that the use of an amino-acid based polymer without hydroxyphosphonoacetic or the other phosphonic acid is beneficial at inhibiting white rust. According to another preferred embodiment, a composition for treating white rust comprises an amino-acid based polymer and hydroxyphosphonoacetic acid, without another phosphonic acid. According to yet another preferred embodiment, a composition for treating white rust comprises an amino-acid based polymer, without any hydroxyphosphonoacetic acid. The preferred concentrations and ranges for these components when added to the water being treated for white rust are the same as for inhibiting corrosion.

In addition to unexpected and synergistic effect of the inhibitor composition on white rust and on ferrous metal corrosion inhibition in low LSI water, the same composition also has a positive effect on preventing formation of mineral scale in high LSI water (LSI>1). Mineral scale includes calcium and magnesium carbonate, calcium phosphate, calcium sulfate, and silica. Solubility of calcium carbonate and phosphate decreases when temperature increases, making calcium carbonate and calcium phosphate more of an issue in water systems with higher temperatures, such as cooling towers. LSI is determined by the following formula:

LSI=pH−pHs, where pHs is pH at CaCO3 saturation point.

An LSI>0 indicates scaling, as scale can form and CaCO3 precipitation may occur. An LSI 0 indicates nonscaling, as there is no potential to scale and the water will dissolve CaCO3. As will be understood by those of ordinary skill in the art, LSI is an indication of driving force and not strict quantitative indication of scale formation, which will depend on the water characteristics, temperature, and water systems operations. However, without a scale inhibitor, scale will typically precipitate out of water when the LSI is greater than 0.2. Using a treatment composition according to preferred embodiments of the invention, no scale will form (calcium carbonate will not precipitate out of the water) at LSI values of 1-3.

When added to the water in the water system being treated, a preferred composition according to the invention for inhibiting scale yields at least 2 ppm active AAP, at least 2 ppm active HPA, and at least 1.5 ppm of the other phosphonic acid. More preferably, when added to the water in the water system being treated, a preferred composition yields 2 ppm-50 ppm AAP, 2 ppm-50 ppm HPA, and 1.5 ppm-20 ppm of the other phosphonic acid and most preferably between 3 ppm-30 ppm AAP, 2 ppm-20 ppm HPA, and 1.5 ppm-10 ppm of the other phosphonic acid. Additionally, the combined total of the three components of a preferred composition yields at least 6.5 ppm active scale inhibitors when added to the water being treated. These ingredients have the unexpected synergistic effect of improved corrosion inhibition in high LSI water systems (LSI>1) without requiring the use of toxic metals and without being adversely impacted by biocides.

Treatment compositions according to preferred embodiments of the invention provide an all-in-one treatment that is able to inhibit corrosion of metals such as ferrous metals, aluminum and its alloys, copper and its alloys, zinc and its alloys, galvanized steel (including white rust), lead, or solder, and to prevent mineral scale formation. The treatment compositions are particularly useful in water systems such as open recirculating systems, closed loop cooling or heating systems, and boilers that may experience corrosion, white rust, and scale formation during different times of the year or under different operating conditions, including use in both low LSI (high corrosively water) and high LSI (high scale tendency) waters.

According to other preferred embodiments, compositions for inhibiting corrosion or white rust or scale also comprise one or more of the following ingredients: a neutralizing amine, chlorine stabilizer, such as monoethanol amine (MEA); a secondary scale inhibitor (since the composition itself also works as a scale inhibitor) and dispersion agent, such as polycarboxylate polymer and/or carboxylate/sulfonate functional copolymers (typical examples: polyacrylic acid (PAA), polymethacrylic acid (PMAA), polymaleic acid (PMA), and copolymers of acrylic acid and 2-acylamido-methylpropane sulfonic acid (AA/AMPS); other scale and corrosion inhibitors, chelant agents; azole corrosion inhibitors, such as benzotriazole, alkylbenzotriazole (tolyltriazole); and/or a fluorescent dye tracer, such as 1,3,6,8-Pyrenetetrasulfonic acid tetrasodium salt (PTSA). The overall composition preferably comprises around 2%-15% (by weight) of an amino-acid based polymer (such as polyaspartic acid), around 2% to 10% (by weight) of hydroxyphosphonoacetic acid, and around 2% to 10% (by weight) of another phosphonic acid.

According to one preferred method of preventing corrosion of metal components, white rust on galvanized steel components, and/or scale in a water system, a treatment composition according to the preferred embodiments of invention as described above is added to the water system. For a composition combining one or more of the AAP, HPA, and another phosphonic acid as described above, a preferred method for corrosion and white rust inhibition comprises feeding the composition into the water at an effective feed rate of 20 ppm-600 ppm, or more preferably 100-300 ppm, of treatment composition, depending on the treated water chemistry and the amount of optional components in the treatment composition. Preferably, a sufficient amount of treatment composition is added to the water system to provide effective active amounts of one or more of the three treatment components (depending on whether white rust is being treated or both corrosion and white rust) of at least 3 ppm AAP, at least 3 ppm HPA, and at least 2 ppm of another phosphonic acid, each as concentrations when added to the volume of water in the water system being treated. More preferably, the treatment composition is added in a sufficient amount to provide effective active amounts one or more of the components of between 3 ppm-50 ppm AAP, between 3 pm-50 ppm HPA, and between 2 ppm-20 ppm of another phosphonic acid when added to the water in the water system. Most preferably, these effective active amounts are 5 ppm-30 ppm AAP, 3 ppm-20 ppm HPA, and 2 ppm-10 ppm other phosphonic acid when added to the water in the water system.

For a composition combining one or more of the AAP, HPA, and another phosphonic acid as described above, a preferred method for scale inhibition comprises feeding the composition into the water at an effective feed rate of 20 ppm-600 ppm, or more preferably 50-300 ppm, of treatment composition, depending on the treated water chemistry and the amount of optional components in the treatment composition. Preferably, a sufficient amount of treatment composition is added to the water system to provide effective active amounts of one or more of the three treatment components of at least 2 ppm AAP, at least 2 ppm HPA, and at least 1.5 ppm of another phosphonic acid, each as concentrations when added to the volume of water in the water system being treated. More preferably, the treatment composition is added in a sufficient amount to provide effective active amounts of the three treatment components of 2 ppm-50 ppm AAP, 2 ppm-50 ppm HPA, and 1.5 ppm-20 ppm of another phosphonic acid, each as concentrations when added to the volume of water in the water system being treated. Most preferably, the treatment composition is added in a sufficient amount to provide effective active amounts of the three components of between 3 ppm-30 ppm AAP, between 2 pm-20 ppm HPA, and between 1.5 ppm-10 ppm of another phosphonic acid when added to the water in the water system.

BRIEF DESCRIPTION OF THE DRAWINGS

The composition and method of the invention are further described and explained in relation to the following figures wherein.

DESCRIPTION OF PREFERRED EMBODIMENTS

Several lab tests were run to test the effectiveness of various compositions according to the invention. Compositions according to the invention were evaluated using spinner tests to simulate flowing water over metal components in a water system. Each spinner test set-up comprises a stainless steel container of water with four metal coupons (mild steel coupons (C1010) and copper coupons (CDA 11) were used) suspended in the water in each container from holders hanging from a rotating shaft. The shaft rotates the coupons in the water in the stainless steel container at 147 rotations/min, representing a flow rate of 3-5 ft/s, depending on coupon distance from center of the rotating shaft. The initial volume of water used in each spinner test was characteristic of corrosive, low hardness water typically found in water systems. The water used had the characteristics shown in Table 1 below.

TABLE 1

Low hardness, corrosive water used in Spinner test experiments

| Characteristic | Value | Unit |
| --- | --- | --- |
| pH | 8 to 8.5 | |
| Conductivity | 220 | cP |
| Ca Hardness | 30 | ppm, (as CaCO3) |
| Mg Hardness | 10 | ppm, (as CaCO3) |
| Chlorides, Total | 25 | ppm Cl |
| M Alkalinity | 30 | ppm, (as CaCO3) |
| Sulfate, Total | 28 | ppm, as SO4 |

During each spinner test the water is aerated and maintained at constant temperature of 120F and constant volume (any evaporation is compensated with automatic addition of deionized water when water level drops below sensor level). Standard test duration is 48 hours.

Using the spinner test set-up, compositions according to preferred embodiments of the invention (Example Nos. 1-3 including AAP, HPA, and another phosphonic acid—HEDP) without any added zinc or tin (as shown in Table 2) were compared to compositions using only zinc (Comp. Ex. 4), only tin (Comp. Ex. 5), only AAP (Comp. Ex. 6), only HPA (Comp. Ex. 7), HPA combined with tin (Comp. Ex. 8), and AAP combined with tin (Comp. Ex. 9) (all as shown in Table 3) as the primary inhibitor(s). The ppm concentrations of the various treatments are concentrations when added to the volume of water in the spinner test container. The compositions with zinc or tin were for comparison to those without. Zinc is typically used as corrosion inhibitor in water systems with highly corrosive water (low LSI). However its usage is undesirable due to toxicity issues and its use face regulations in some locations. Tin has been promoted and patented as a non-toxic alternative to zinc, but it is more expensive. In addition to the primary corrosion inhibitor components listed in Tables 2 and 3, all of the tests were carried out in the presence 4 ppm active AA/AMPS copolymer and 4 ppm active TTA. These ingredients were added to the water in each spinner test set-up to provide those concentration levels. The corrosion and pitting level for mild steel coupons after spinner tests in presence of different inhibitors are presented in FIG. 1.

TABLE 2

Corrosion inhibitor compositions according to the invention

| Inhibitor | Unit | Example 1 | Example 2 | Example 3 |
|---|---|---|---|---|
| AAP (amino acid based polymer - such as a commercially available water solution containing about 40% of salt) | ppm active* | 7.5 | 5.2 | 5.2 |
| HPA (hydroxyphosphonoacetic acid) | ppm active | 2.5 | 5.0 | 5.0 |
| HEDP | ppm active | 3 | 3 | 3 |
| MEA | ppm | 0.25 | 1.0 | |
| Zn (zinc) | ppm active | N/A | N/A | N/A |
| Sn (tin) | ppm active | N/A | N/a | N/A |

*ppm active refers to the amount of active raw material, in contrast to ppm which refers to the weight of raw material in mg/L. For example, HPA is commercially available as a 50% water solution, so adding 10 ppm raw material will provide 5 ppm active HPA.

TABLE 3

Corrosion inhibitor compositions - Comparative Examples

| Inhibitor | Unit | Comp. Ex 4 | Comp. Ex 5 | Comp. Ex 6 | Comp Ex 7 | Comp. Ex 8 | Comp. Ex 9 |
|---|---|---|---|---|---|---|---|
| AAP | ppm active | | | 15 | | | 7.5 |
| HPA | ppm active | | | | 5 | 5 | |
| HEDP | ppm active | 3 | 3 | 3 | 3 | 3 | 3 |
| MEA | ppm | | | | | | |
| Zn | ppm active | 1 | | | | | |
| Sn | ppm active | | 1 | | | 1 | 0.5 |

Figure 1:
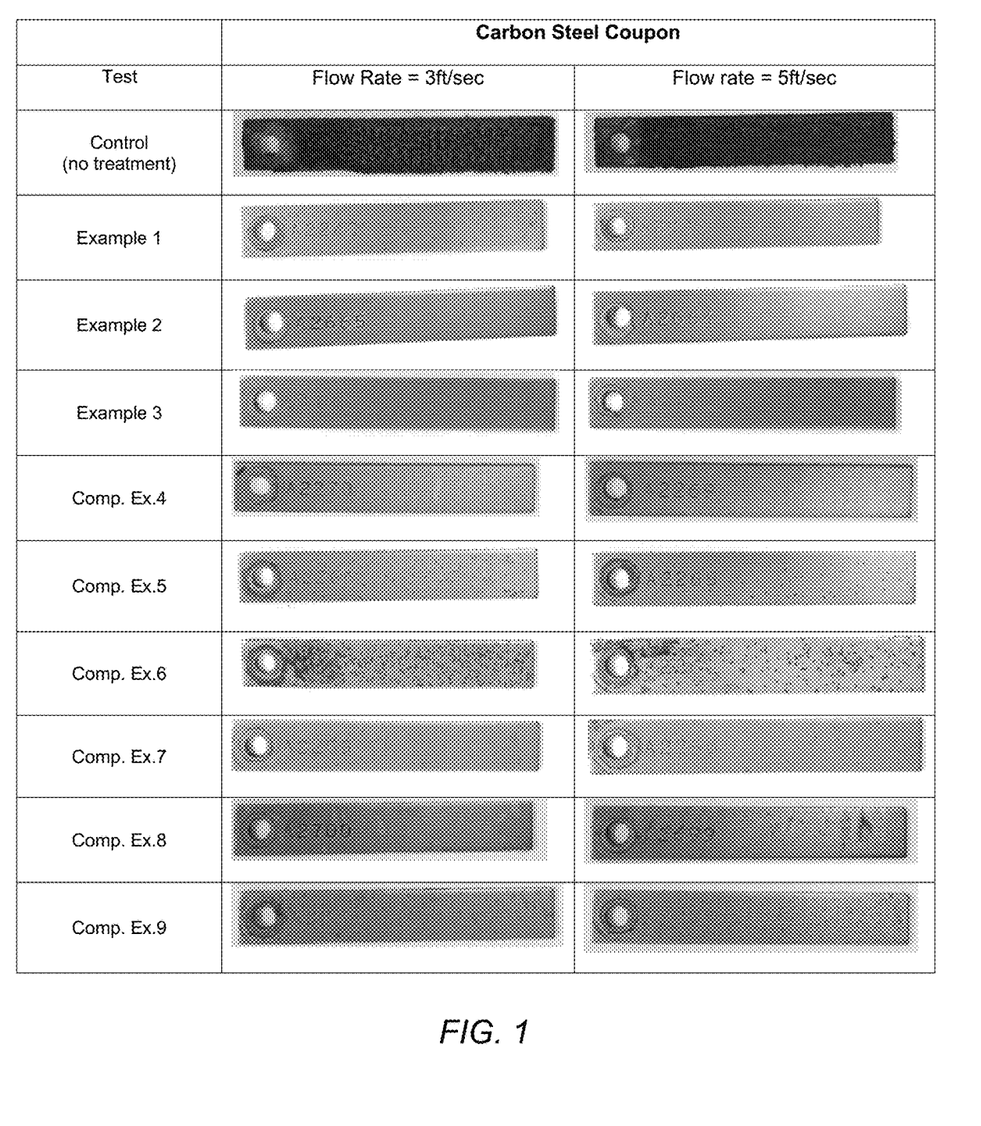
FIG. 1 contains photographs showing corrosion levels on steel coupons after spinner tests at flow rates of 3 ft/sec and 5 ft/sec.

Spinner tests were run with each composition at a flow rate equivalent to around 3 ft/second and at a flow rate equivalent to around 5 ft/second. A control test, without any treatment was also carried out for comparison. FIG. 1 shows photographs of a representative mild steel coupon after each spinner test with the control and with Example Composition Nos. 1-9. The amount of corrosion and pitting on the coupons is shown in the photographs. As can be seen, the control coupons show extensive corrosion (dark areas on photographs). The coupons used with compositions according to preferred embodiments of the invention (Ex. Nos. 2-3) show little, if any, corrosion or pitting (very few dark areas on photographs). The coupons used with Ex. No. 1, which contains all three components according to a preferred embodiment of the invention for corrosion inhibition, but only contains 2.5 ppm HPA (less than the more preferred amount of at least 3 ppm), shows improved results over the control and the comparative examples (Comp. Nos. 4-9), but shows slightly more corrosion than Ex. Nos. 2-3, where 5 ppm of HPA was used. The coupons used with the comparative compositions (Comp. Nos. 4-9) are significantly better than the control, but do show evidence of corrosion and pitting that is greater than with Ex. Nos. 1-3. Based on the results, it appears that the combination of AAP, HPA, and another phosphonic acid (in these examples, HEDP) interact synergistically to provide improved corrosion control, without requiring the use of zinc, tin or other regulated metals.

Some prior art water treatment corrosion inhibition compositions do not provide effective protection when oxidizing biocides are used in the same system to prevent biological growth. The most widely used oxidizing biocides are chlorine and stabilized bromine. Additional spinner corrosion tests were carried out using Example compositions Nos. 2 and 3 compared to comparative Example compositions Nos. 4 (zinc only) and 7 (HPA only) in the presence of a stabilized bromine biocide composition (commercially available as Chem-Aqua 42171). Example compositions 4 and 7 were selected because they showed the best results in the spinner tests of the comparative examples. Both Comp. Ex. Nos. 4 and 7 perform fairly well in low LSI water, but as discussed below, significantly worse when biocide is added. Also, Comp. Ex. No. 4 is based on zinc, which is undesirable to use due to toxicity concerns. As with the prior tests, these tests were carried out in presence 4 ppm active AA/AMPS copolymer and 4 ppm active TTA. A slug dose of 40 ppm of biocide was added at the beginning of each spinner test (after the corrosion inhibition composition was added and the test started) to yield about 1 ppm FHR (free halogen residue).

Figure 2:
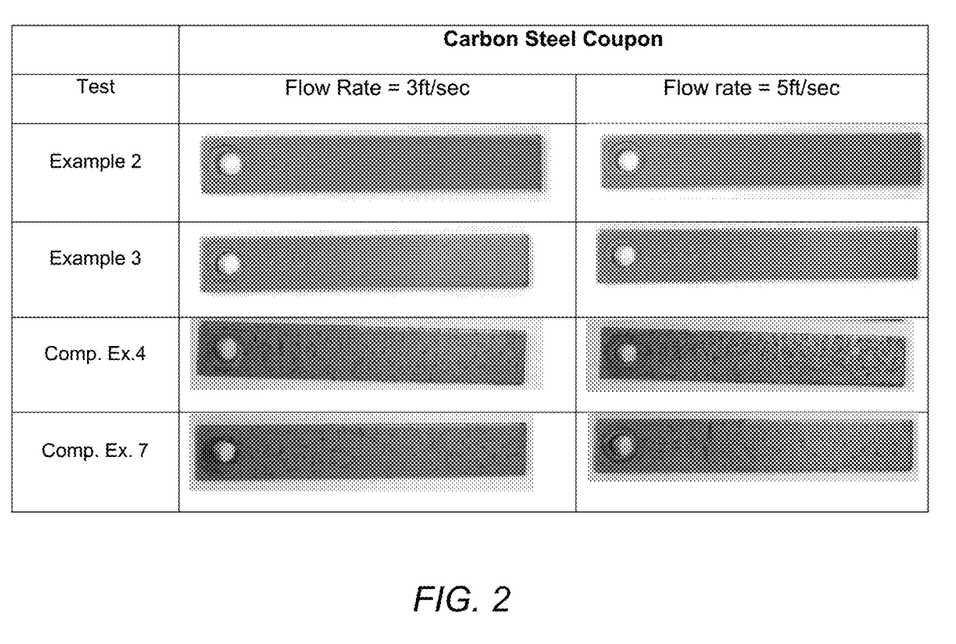
FIG. 2 contains photographs showing corrosion levels on steel coupons after spinner tests run in presence of biocide at flow rates of 3 ft/sec and 5 ft/sec.

FIG. 2 shows photographs of a representative mild steel coupon after each spinner test with the Example Compositions in the presence of biocide. As can be seen, the coupons used with compositions according to preferred embodiments of the invention (Ex. Nos. 2-3) show little, if any, corrosion or pitting, indicating that the functionality of preferred compositions according to the invention is not negatively affected by a biocide. The coupons used with the comparative compositions (Comp. Ex. Nos. 4 and 7) show substantially more corrosion than with Ex. Nos. 2-3. It is noted that Comp. No. 7 was the use of HPA and HEDP, without any AAP, which showed good results without biocide, but significantly more corrosion occurred when a biocide was added. The comparative composition having AAP and HEDP, without any HPA, (Comp. Ex. No. 6) did so poorly without biocide (FIG. 1 above) that it was not tested with biocide because the results would be expected to be even worse than in FIG. 1. Based on the results, it appears that the combination of AAP, HPA, and another phosphonic acid together interact synergistically to provide improved corrosion control even in the presence of a biocide and show improved results over the use of HPA alone.

Corrosion rates for the mild steel coupons were also measured and calculated from weight loss of the coupons. The results of both the spinner tests without added biocide and with added biocide are summarized in Table 4. Information on corrosion mode, particularly the presence of pitting (which is important in many applications and some corrosion inhibitors, including HPA used alone, are known to be poor protectors against pitting), is also included in Table 4. Most preferably, corrosion inhibitor compositions according to the embodiments of the invention achieve corrosion rates of 3 MPY or less for corrosion, even in the presence of a biocide.

TABLE 4

Corrosion Rates form spinner test experiments
Mild Steel Coupon Corrosion Rate, MPY [mil/yr]

| | Low Hardness Water | | | Low Hardness Water + Biocide | | |
|---|---|---|---|---|---|---|
| | Corrosion | | | | | |
| | | | Pitting | | | |
| Test | 3 ft/sec | 5 ft/sec | Scale | 3 ft/sec | 5 ft/sec | Pitting |
| Control | 370 | 243 | N/A | | | |
| Example 1 | 2.7 | 2.5 | None | | | |
| Example 2 | 2.9 | 2.4 | None | 2.2 | 2.0 | None |
| Example 3 | 2.5 | 2.5 | None | 2.7 | 2.4 | None |
| Comp. Ex 4 | 2.7 | 2.7 | Limited | 8.0 | 11 | Sever pitting |
| Comp. Ex 5 | 4.0 | 4.6 | Pitting | | | |
| Comp. Ex 6 | 13.6 | 8.2 | Severe pitting | | | |
| Comp. Ex 7 | 2.6 | 3.2 | Limited | 6.4 | 5.7 | Severe pitting |
| Comp. Ex 8 | 3.9 | 5.2 | Pitting | | | |
| Comp. Ex 9 | 3.8 | 3.2 | Sever pitting | | | |

Pitting scale description:
None = no pitting observed
Limited = few (1-5) pitts per coupon, usually very shallow
Pitting = significant number of pits on coupons (5-50)
Sever pitting = a large number of pits (>50), usually dipper and larger Compositions according to preferred embodiments of the invention contain organic phosphate from the HPA and from the other phosphonic acid used in these examples (HEDP). In the presence of a biocide, the organic phosphate is often reverted to orthophosphate, which is not as good in preventing corrosion or scale and also may cause issues with forming calcium phosphate scale. When the combination of AAP, HPA, and HEDP (or another phosphonic acid) is used as a corrosion inhibitor according to a preferred embodiment of the invention, virtually no reversion of organic phosphate to orthophosphate was detected. Samples from composition Example Nos. 2 and 3 and comparative Example No. 7 were tested for the presence of orthophosphates upon mixing of the composition and again after 48 hours. The results are listed below in Table 5. Example Nos. 2 and 3, which use AAP, HPA, and HEDP (and contain AA/AMPS and TTA as noted above), showed very little orthophosphate increase over the 48 hour period, but comparative Example No. 7 which contains HPA and HEDP (and contains AA/AMPS and TTA as noted above), but no AAP, showed a substantial increase.

TABLE 5

Orthophosphate levels in low hardness test water in presence of biocide during the spinner corrosion test

| | Orthophosphate (ppm PO4) | |
|---|---|---|
| Test | Initial | 48 hr (End of Test) |
| Example 2 | 0.4 | 0.5 |
| Example 3 | 0.2 | 0.4 |
| Comp. Ex -7 | 0.3 | 1.6 |

According to another preferred embodiment, a water treatment composition as listed in Table 6 (which is the same as Ex. 2 tested above) is effective at inhibiting corrosion and scale in a water system over a broad range of LSI values (−2.5 to >3) and in the presence of a biocide.

TABLE 6

| Component | Wt % | Active %* in Composition |
|---|---|---|
| Sodium polyasparte (AAP) | 13.0 | 5.2% as AAP |
| Hydroxy phosphonoacetic Acid (HPA) | 10.0 | 5.0% as HPA |
| 1-Hydroxyethylidene 1,1-diphosphonic acid (HEDP) or 2-phosphonobutane-1,2,4,tricarboxylic acid (PBTC) | 5.25-6.4 | 1.2-3.0% as PO4 |
| Monoethanolamine (MEA) (optional) | 1.0 | 0.99% |
| Copolymer of acrylic acid and sulfonated monomer (AA/AMPS) | 8.78 | 3.9% as AA/AMPS |
| Tolyltriazole (TTA) | 9.40 | 4.0% as TTA |
| 1,3,6,8-Pyrenetetrasulfonic acid tetrasodium salt (PTSA) | 1.00 | 1% as PTSA |
| NaOH or KOH | 15.00-16.25 | N/A |
| Deionized water | 35.17-36.57 | N/A |

*Active % refers to active weight percent. Wt % is raw material weight percent. Most of the raw materials are aqueous solutions and contain only a certain amount of solids that is the actual chemical component. The amount of active (Active %) is calculated based on raw material weight percent and the amount of the chemical in the solution per the information provided by the supplier. For example, a commercially available source of AAP may be a 40% solution of AAP in water, so if 13% of that product is used, the active amount of AAP equals: 0.13*0.40*100% = 5.2% of AAP (active) in the formula NaOH and/or KOH is preferably also added to the composition according to an embodiment of the invention. These ingredients are typically added to water treatment formulations in order to neutralize acid and to bring the pH of the final composition to the desired level. Most of the compositions will have pH>8, some will have pH>12. In compositions where TTA is used (as with a preferred embodiment of a composition according to the invention) it is desirable to have higher pH (>11) for the composition in order to ensure solubility of TTA, which has very poor solubility at lower pH.

Figure 3:
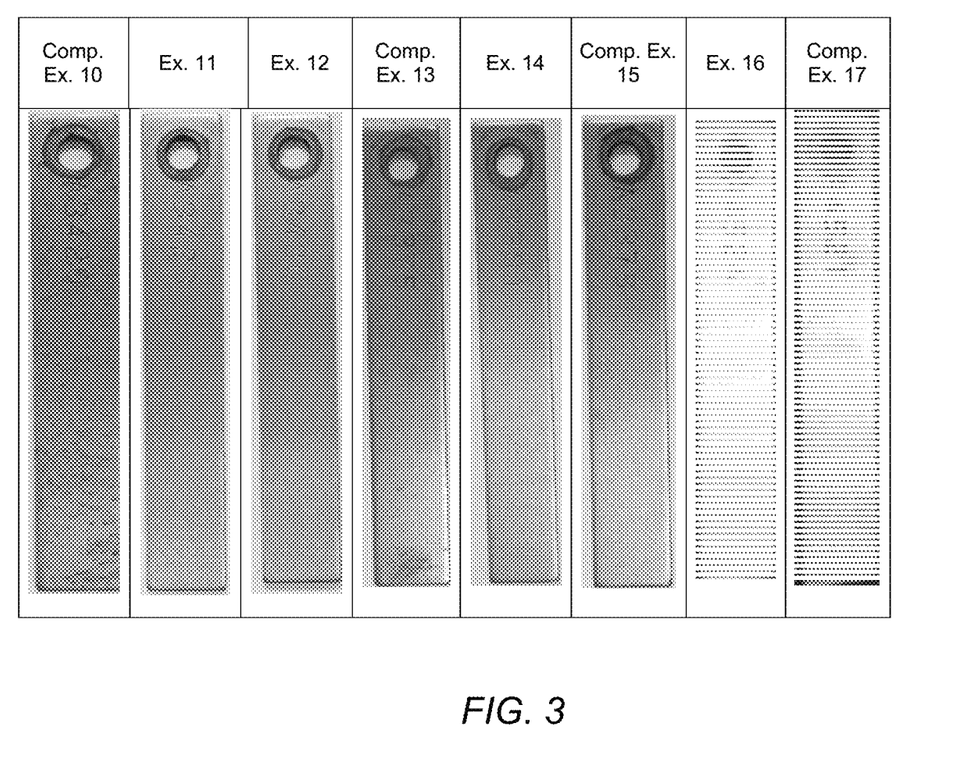
FIG. 3 contains photographs showing corrosion levels on steel coupons after spinner tests at a flow rate of 3 ft/sec.

Additional spinner tests in low LSI water were carried out in order to test the effectiveness of various concentrations of treatment compositions for inhibiting corrosion according to preferred embodiments of the invention. The same spinner test parameters and low LSI water (Table 1) described above were used for these tests. The concentrations of the ingredients when added to the spinner test water and the results of these tests are shown below in Table 7. FIG. 3 shows photographs of the test coupons (tested at a flow rate of 3 ft/sec) for each composition after the test was completed.

TABLE 7

Additional Spinner Test Compositions & Results

| Inhibitor | Unit | Comp. Ex. 10 | Ex. 11 | Ex. 12 | Comp. Ex. 13 | Ex. 14 | Comp. Ex. 15 | Ex. 16 | Comp. Ex. 17 |
|---|---|---|---|---|---|---|---|---|---|
| AAP | ppm active | 2.6 | 5.2 | 7.8 | 5.0 | 10 | 10 | 5.0 | 5.0 |
| HPA | ppm active | 2.5 | 5.0 | 7.5 | 2.5 | 5 | 2.5 | 5.0 | 5.0 |
| AAP:HPA Ratio | | 51:49 | 51:49 | 51:49 | 67:33 | 67:33 | 80:20 | 51:49 | 51:49 |
| HEDP | ppm active | 1.6 (1.5 ppm $PO_4$) | 3.26 (3 ppm $PO_4$) | 4.7 (4.4 ppm $PO_4$) | 3.26 (3 ppm $PO_4$) | 3.26 (3 ppm $PO_4$) | 3.26 (3 ppm $PO_4$) | | |
| PBTC | ppm active | | | | | | | 2.6 (0.95 ppm $PO_4$) | |
| MEA | ppm | | | | 0.5 | 1 | 0.5 | | |
| TTA | ppm TTA | 4 | 4 | 4 | 4 | 4 | 4 | 4 | 4 |
| AA/AMPS Copolymer | ppm active | 4 | 4 | 4 | 4 | 4 | 4 | 4 | 4 |
| Corrosion Results from Spinner Test (low LSI water), mild steel (C1010) coupons at 3 ft/sec flow rate | | | | | | | | | |
| Corrosion Rate* | MPY (mil/yr) | 5.2 | 2.3 | 1.5 | 3.1 | 2.2 | 3.5 | 2.1 | 3.3 |
| Pitting | | Pitting | none | none | none | none | none | none | None |

*Average for 2 coupons from the same spinner test pot at 3 ft/sec

Comparative Examples 10, 13, and 15 use AAP, HPA, and HEDP but in amounts less than the preferred concentrations. These examples show increased corrosion (and Comp. Ex. 10 showed moderate pitting) at low levels of the inhibitors. Example Nos. 11-12, 14, and 16 according to preferred embodiments of the invention show good performance (low corrosion rate and no pitting) for different optional components and varying concentrations and ratios of AAP to HPA. The examples also show that the change from HEDP to PBTC (Ex. 16) and reduction of secondary chelates does not affect the corrosion inhibition performance of compositions according to preferred embodiments of the invention. Example No. 17 used AAP and HPA, without a second phosphonic acid, similar to the composition described in the '023 patent. It shows improved results in controlling corrosion in low LSI water, but the results are not as good as in the examples according to preferred embodiments of the invention.

Additional spinner tests were conducted to compare compositions using AAP and PBTC as disclosed in the '023 patent with compositions according to preferred embodiments of the invention. The test set-up was the same as described above using low LSI water, mild steel (C1010) coupons, and a flow rate of 3 ft/sec. The results are shown in Table 8 below.

TABLE 8

Comparing Compositons Using One Phosphonic Acid to Compositions Using Two Phosphonic Acids

| Inhibitor | Unit | Comp. Example 18 80:20 PBTC/AAP | Comp. Example 19 40:60 PBTC/AAP | Example 20 | Example 21 | Example 12 (same as in Table 7) |
|---|---|---|---|---|---|---|
| PBTC | ppm active | 16 | 8 | 4.8 | 8 | |
| HEDP | ppm active | | | | | 4.7 |
| AAP | ppm active | 4 | 12 | 7.8 | 4 | 7.8 |
| HPA | ppm active | | | 7.5 | 8 | 7.5 |
| TTA | ppm TTA | 4 | 4 | 4 | 4 | 4 |
| AA/AMPS Copolymer | ppm active | 4 | 4 | 4 | 4 | 4 |
| Corrosion Rate* | MPY (mil/yr) | 3.1 | 3.1 | 1.9 | 1.7 | 1.5 |
| Pitting | | none | none | none | none | None |

*Average for 2 coupons from the same pot at 3 ft/sec

As can be seen, the examples according to preferred embodiments of the invention (Example Nos. 20, 21, and 12) with AAP, HPA, and a second phosphonic acid (HEDP or PBTC) show much beter corrosion inhibition results than the comparatve examples using only AAP and PBTC (without any HPA). It is also noted that Comp. Ex. Nos. 18-19 resulted in corrosion rates greater than 3 MPY even when using 20 ppm total inhibitor (AAP and PBTC), which is higher than the corrosion rate achievable with preferred compositions according to the invention using substantially less total inhibitor, such as Example No. 11, which had a corrosion rate of 2.3 MPY using only 13.5 ppm total inhibitors (AAP, HPA, HEDP), and Example No. 16, which had a corrosion rate of 2.1 MPY using only 12.6 ppm total inhibitors (AAP, HPA, PBTC). Additionally, the corrosion rates of Comp. Ex. Nos. 18-19 are comparable to those in Comp. Ex. Nos. 13 and 15, which use AAP, HPA, and a second phosphonic acid, but the total amount of inhibitor needed to achieve the results in Comp. Ex. Nos. 18-19 (20 ppm total) is much higher than that needed in Nos. 13 and 15 (10.76 and 15.76 ppm total, respectively). The results of these experiments show that the addition of a second phosphonic acid, in combination with AAP and HPA, provides an unexpected synergistic effect that improves corrosion inhibition even when less total inhibitor is used and even in the presence of a biocide.

Those of ordinary skill in the art will understand that other sutiable or equivalent chemical compounds and other treatment compounds, including other corrosion inhibitors, may be substituted for any of the above ingredients or added to any of the above ingredients within the scope of this invention. Compositions according to the embodiments of the invention are effective in inhibiting corrosion on metal components in water systems over a broad range of LSI values, including LSI<0, and without requiring the use of regulated toxic metals. These compositions are also effective at higher pH values (7-9) typically found in water systems, such as cooling towers and boilers, whereas some prior art inhibitors are ineffective or their effectiveness is reduced at such pH levels (for example, a polyaspartic acid/stannous salt treatment is effective only at pH 5-7). These compositions according to the invention also prevent reversion of organic phosphate to orthophosphate to maintain effectiveness in the presence of a biocide.

Other experiments using an electrochemical method were conducted to test compositions according to the invention for white rust prevention. The results in Table 9 below show synergistic effect of combining HPA and AAP (without another phosphonic acid) in reducing white rust formation as compared to use of each individual component (HPA alone and AAP alone). The cyclic voltammetry test was conducted in 0.1M sodium carbonate solution using zinc electrode. The measure of oxidation is the area under the oxidation curve peak observed; the lower the area the less oxidation occurs, meaning lower corrosion rate. The results are the averages of 6-10 experiments with standard deviation.

TABLE 9

| Inhibitor | Concentration [ppm active] | Measure of Oxidation [Coulombs*$10^{-3}$] |
| --- | --- | --- |
| AAP | 50 | 1.2 ± 0.2 |
| HPA | 50 | 1.0 ± 0.1 |
| AAP/HPA (1:1 ratio) | 25:25 | 0.8 ± 0.1 |

Additional spinner corrosion tests were carried out in stainless steel containers in high alkalinity water known to form white rust on galvanized surfaces to test the effectiveness of compositions according to preferred embodiments of the invention for the prevention of white rust formation. The water chemistry, characteristic of high alkalinity synthetic water, in these tests is detailed in Table 10 below. Four Hot Dip Galvanized steel coupons (HDG G70) with dimensions 1.0×4.0×0.02 in were installed in each container on the holders hanging from a rotating shaft that rotates at 147 rotations/min that represents flow rate of 3-5 ft/s, depending on coupon distance from center of the rotating shaft. During the tests the water was aerated and maintained at constant temperature of 120F and constant volume (any evaporation was compensated with automatic addition of DI water when the water level dropped below a sensor level). Standard test duration was 48 hours. The active ingredients used in two comparative examples and three examples of preferred compositions according to the invention, along with corrosion rates, are listed in Table 11.

TABLE 10

High alkalinity/no hardness water used in Spinner test experiments for white rust prevention

| Characteristic | Value | Unit |
| --- | --- | --- |
| pH | 8.7-8.9 | |
| Conductivity | 2300 | cP |
| Ca Hardness | 0 | ppm, (as CaCO3) |
| Mg Hardness | 0 | ppm, (as CaCO3) |
| Chlorides, Total | 250 | ppm Cl |
| M Alkalinity | 200 | ppm, (as CaCO3) |
| Sulfate, Total | 500 | ppm, as SO4 |

TABLE 11

Active Ingredients Composition and Galvanized Coupon Corrosion Rate

| Inhibitor | Unit | Comp. Ex. 22 - No Inhibitor | Comp. Ex. 23 | Ex. 24 | Ex. 25 | Ex. 26 |
| --- | --- | --- | --- | --- | --- | --- |
| AAP | ppm active | — | — | 15 | 7.5 | 15 |
| HPA | ppm active | — | 7.5 | 7.5 | 2.5 | — |
| HEDP | ppm active | — | 3.26 (3 ppm PO4) | 3.26 (3 ppm PO4) | 3.26 (3 ppm PO4) | 3.26 (3 ppm PO4) |
| TTA | ppm TTA | — | 4 | 4 | 4 | 4 |
| AA/AMPS Copolymer | ppm active | — | 4 | 4 | 4 | 4 |
| Corrosion Results- Galvanized Coupons (HDG G70) | | | | | | |
| Corrosion Rate* | MPY (mil/yr) | 53.7 | 24.3 | 9.9 | 14.0 | 10.7 |

*Average for 4 coupons from the same pot (two at 3 ft/sec and two at 5 ft/sec flow rate)

In order to calculate the corrosion rate using the weight loss method, the galvanized coupons from these tests were cleaned according to standard procedure by immersing coupons in concentrated ammonium acetate and rinsing.

Figure 4:
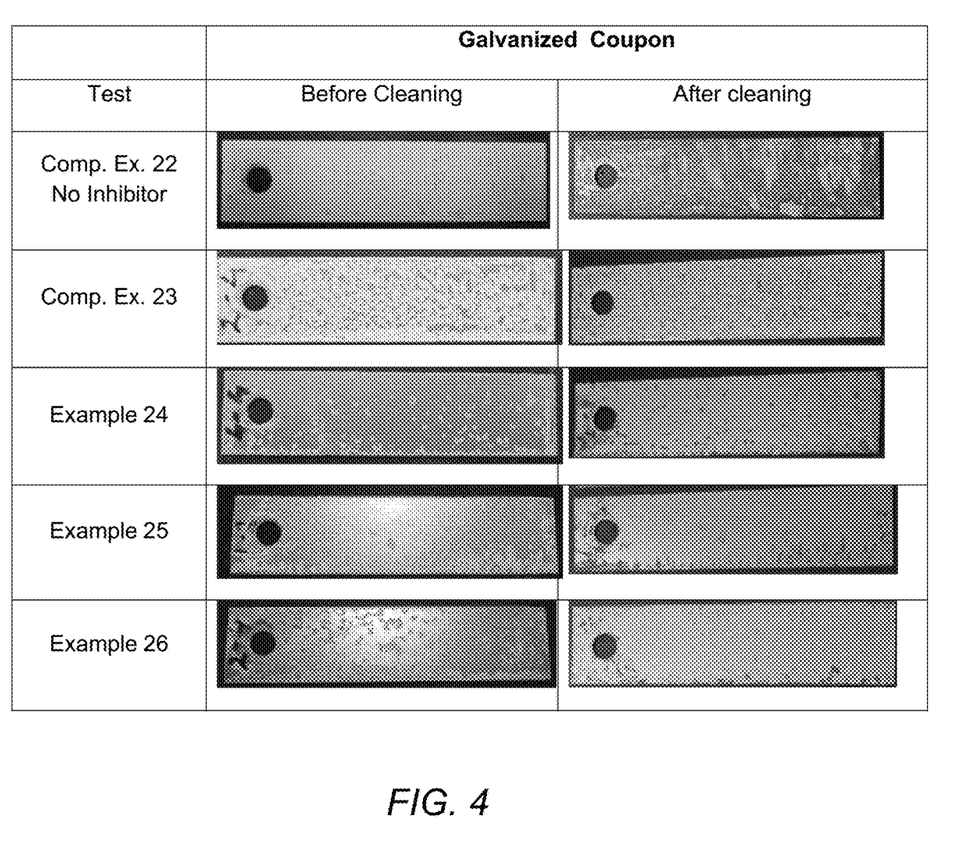
FIG. 4 contains photographs showing white rust levels on galvanized coupons after spinner tests.

FIG. 4 shows photographs of the galvanized coupons after the spinner tests with the compositions described in Table 12, both before and after cleaning. The white deposit visible on the coupons before cleaning is white rust. The damage of the galvanized layer due to corrosion, shown as dark spots, is visible on the coupons after cleaning. The blank (Comp. Ex. 22—No Treatment) coupon was completely covered in white deposit and after cleaning most of the galvanized layer was removed with visible mild steel corrosion. The coupon treated with HPA and HEDP without an amino-acid based polymer (Comp. Ex. 23) showed substantial white rust formation, but was still a great improvement over the control (Comp. Ex. 22). Significantly better results were obtained with compositions in Examples 24-26. The best results were achieved with Ex. 24 using AAP, HPA at greater than 3 ppm, and a second phosphonic acid (HEDP). Although the use of HPA is important in inhibiting mild steel corrosion, its use is optional for white rust treatment. As can be seen from Example 26, the results of using AAP and HEDP without HPA were almost as good as the three combined. Accordingly, a preferred composition for treating white rust according to the invention comprises 2-15% amino-acid based polymer, 0-10% HPA, and 0-10% of a second phosphonic acid. Preferably, the amount of active amino-acid based polymer in a treatment composition according to the invention is at least 3 ppm, more preferably 3 ppm-50 ppm, and most preferably 5 ppm-30 ppm, all as concentrations when added to the volume of water in the water system being treated. More preferably, the AAP is used in conjunction with HPA in an amount of at least 3 ppm, more preferably from 3 ppm-50 ppm, and most preferably from about 3 ppm-20 ppm and/or another phosphonic acid in an amount of at least 2 ppm more preferably from 2 ppm-20 ppm, and most preferably from about 2 ppm-10 ppm.

For treating white rust according to the invention, it is preferred to use both hydroxyphosphonoacetic acid and an amino-acid based polymer, and more preferably in conjunction with a second phosphonic acid, in the weight range amounts indicated above, but it has also been found that the use of an amino-acid based polymer or hydroxyphosphonoacetic without the other is beneficial at inhibiting white rust.

A pilot cooling tower scale test using a composition according to a preferred embodiment of the invention was also conducted to test the ability to inhibit scale formation in high LSI water (LSI>1). The objective of the cooling tower scale test was to determine the number of cycles at which the tower can operate without scaling and the LSI limit of treatment in typical water with scaling characteristics as it cycles up. The cooling tower pilot test used 4 heat transfer surface rods and a DATS (Deposit Accumulation Testing System) operating at 800 Watts. The number of cycles of concentration (COC) is calculated as the ratio of concentration of any ions in the cooling tower water to the concentration of the same ion in makeup (starting) water. Conductivity ratio can also be used to calculate COC. It is desirable to operate at as high COC as possible to reduce water usage. Typically, the COC in a cooling tower is maintained at a certain level by measuring water conductivity, bleeding the system when conductivity increases over a set limit and adding more makeup water. The initial volume of water used in the cooling tower pilot test was characteristic of high LSI water having 100 ppm alkalinity as CaCO3 and 100 ppm calcium hardness as CaCO3 typically found in cooling tower water systems. The water used had the characteristics shown in Table 12 below.

TABLE 12

High LSI water used in Pilot Cooling Tower Scale Test

| Characteristic | Value | Unit |
| --- | --- | --- |
| pH | 8 | |
| Conductivity | 450-520 | µS |
| Ca Hardness | 100 | ppm, (as CaCO3) |
| Mg Hardness | 30 | ppm, (as CaCO3) |
| Chlorides, Total | 71 | ppm Cl |
| Total Alkalinity | 100 | ppm, (as CaCO3) |
| Total Hardness | 130 | ppm, (as CaCO3) |
| Sulfate, Total | 30 | ppm, as SO4 |
| LSI at 60° C. | 1.1 | |

Scale is indicated when the HTR (Heat Transfer Resistance) suddenly increases above stable level and exceed $12 \times 10^{-6}$ Cm$^2$/W and/or heater % clean drops below 97% (as determined from the Heater Transfer coefficient fouled (UF) and clean (UC) values, where UF=1/HTR Scaled+UC and % Cleanliness=UF/UC×100). The LSI limit (the LSI measurement at which scale will form) can also be determined by monitoring changes in water chemistry, water turbidity and visually by observing scale formation. A composition according to Table 6 at a concentration of 100 ppm (when added to the water in the pilot cooling tower system) was found to increase the operational limit of cooling tower to 6 COC and LSI of 3.2 based on HTR and water chemistry data. The pilot cooling tower was operated for 7 days before scale began forming. The test was started with high scaling water, LSI around 1, and was cycled up to 6 COC, which increased LSI to 3.2 before scale began to form.

For comparison, a typical prior art scale treatment, such as Chem-Aqua 31155 (which contains PBTC, sodium tolytriazole, sodium polyacrylate, polymaleic acid (sodium salt) and sodium hydroxide), at the same 100 ppm concentration allows to operate cooling tower only 3 COC that is at LSI limit of only 2.6. Even at double the treatment concentration (200 ppm) of Chem-Aqua 31155, the COC in cooling tower can only be increased to 3.4, with LSI limit of 2.85, which is well under the COC increase and LSI limit achieved using a preferred embodiment of the composition of the invention. In another experiment using the same treatment composition used in the previous pilot cooling tower scale test at 50 ppm (when added to the water in the pilot cooling tower system), the system reached 4.3 COC and LSI of 2.84 before scale began to form. These results further indicate that this three component formula is far better at scale prevention that prior art formulas containing PBTC, even when the prior art formulas are used at 2 to 4 times the concentration. With treatment compositions according to the invention, water in the water system (such as a cooling tower) may be cycled/recirculated more times before scale formation begins compared to prior art treatments. This provides substantial savings on water, since there will be less blow-down and less make-up water added to the water system.

According to one preferred method of preventing corrosion of metal components and/or white rust on galvanized steel components and/or mineral scale formation in a water system, a treatment composition according to the invention as described above is added to the water system at an effective feed rate. For a composition combining one or more of the AAP, HPA, and another phosphonic acid as described above, a preferred method for corrosion and white rust inhibition comprises feeding the composition into the water at an effective feed rate of 20 ppm-600 ppm, or more preferably 100-300 ppm, of treatment composition, depending on the treated water chemistry and the amount of optional components in the treatment composition. Preferably, a sufficient amount of treatment composition is added to the water system to provide effective active amounts of one or more of the three treatment components (depending on whether white rust is being treated or both corrosion and white) rust of at least 3 ppm AAP, at least 3 ppm HPA, and at least 2 ppm of another phosphonic acid, each as concentrations when added to the volume of water in the water system being treated. More preferably, the treatment composition is added in a sufficient amount to provide effective active amounts one or more of the components of between 3 ppm-50 ppm AAP, between 3 pm 50 ppm HPA, and between 2 ppm-20 ppm of another phosphonic acid when added to the water in the water system. Most preferably, these effective active amounts are 5 ppm-30 ppm AAP, 3 ppm-20 ppm HPA, and 2 ppm-10 ppm other phosphonic acid when added to the water in the water system. For treating white rust, the use of HPA is optional, so the treatment composition used in a preferred method according to the invention may comprise AAP without any HPA and be added in amounts sufficient to provide these same concentration ranges of AAP in the water of the water system being treated.

For a composition combining one or more of the AAP, HPA, and another phosphonic acid as described above, a preferred method for scale inhibition comprises feeding the composition into the water at an effective feed rate of 20 ppm-600 ppm, or more preferably 50-300 ppm, of treatment composition, depending on the treated water chemistry and the amount of optional components in the treatment composition. Preferably, a sufficient amount of treatment composition is added to the water system to provide effective active amounts of one or more of the three treatment components of at least 2 ppm AAP, at least 2 ppm HPA, and at least 1.5 ppm of another phosphonic acid, each as concentrations when added to the volume of water in the water system being treated. More preferably, the treatment composition is added in a sufficient amount to provide effective active amounts of the three treatment components of 2 ppm-50 ppm AAP, 2 ppm-50 ppm HPA, and 1.5 ppm-20 ppm of another phosphonic acid, each as concentrations when added to the volume of water in the water system being treated. Most preferably, the treatment composition is added in a sufficient amount to provide effective active amounts of the three components of between 3 ppm-30 ppm AAP, between 2 pm-20 ppm HPA, and between 1.5 ppm-10 ppm of another phosphonic acid when added to the water in the water system According to another preferred embodiment, the composition added to the water system (for treating corrosion, white rust, and/or scale) comprises a fluorescent tracer so that the level of composition in the water system can be measured and monitored. Additional treatment composition is added to the water system as needed, based on the tracer measurements, to maintain an effective amount of treatment within the water system.

All ppm concentrations of the various treatments in the example tests described herein are concentrations when added to the water in the spinner test, to correlate to the concentrations when added to the water in the water system being treated. Unless specifically excluded, all references to acids herein and in the claims include water soluble salts of the acid, as will be understood by those of ordinary skill in the art. Those of ordinary skill in the art will also appreciate upon reading this specification, including the examples contained herein, that modifications and alterations to the preferred embodiments of the composition and method for using the composition to treat water may be made within the scope of the invention and it is intended that the scope of the invention disclosed herein be limited only by the broadest interpretation of the appended claims to which the inventor is legally entitled.

What is claimed:

1. A method of treating a recirculating cooling water system to inhibit corrosion on water system components made of aluminum and its alloys, copper and its alloys, zinc and its alloys, lead, or ferrous metals other than galvanized steel or any combination thereof and to inhibit scale over a range of LSI values of −2.5 to 3, the method comprising adding an amount of an amino-acid based polymer or its water soluble salt, hydroxyphosphonoacetic acid or its water soluble salt, and a second phosphonic acid or its water soluble salt to the water in the water system; and wherein the adding step provides (1) an active concentration of 2 ppm-50 ppm of the amino-acid based polymer or its water soluble salt, an active concentration of 2 ppm-50 ppm of the hydroxyphosphonoacetic acid or its water soluble salt, and an active concentration of 1.5 ppm-20 ppm of the second phosphonic acid or its water soluble salt in the volume of water in the water system to inhibit scale or (2) an active concentration of 3 ppm-50 ppm, of the amino-acid based polymer or its water soluble salt, an active concentration of 3 ppm-50 ppm of the hydroxyphosphonoacetic acid or its water soluble salt, and an active concentration of 2 ppm-20 ppm of the second phosphonic acid or its water soluble salt to inhibit corrosion; and wherein the adding step provides an active amount of amino-acid based polymer or its water soluble salt that is (1) equal to or greater than an active amount of the hydroxyphosphonoacetic acid or its water soluble salt and (2) equal to or greater than an active amount of the second phosphonic acid or its water soluble salt; and wherein no zinc or molybdenum or compounds containing zinc or molybdenum are added to the water in the water system.

2. The method of claim 1 wherein the second phosphonic acid is a phosphonocarboxylic acid or its water soluble salt and the water has an LSI value of 0.2 to 3.0 prior to the adding step, the method further comprising increasing the LSI of the water after the adding step by 2 or more over the LSI prior to the adding step without scale formation.

3. The method of claim 2 wherein the second phosphonic acid is HEDP or its water soluble salt.

4. The method of claim 2 wherein the phosphonocarboxylic acid is PBTC or its water soluble salt; and the amino-acid based polymer is polyaspartic acid or its water soluble salt.

5. The method of claim 4 wherein the LSI value prior to the adding step is 0.2 to 1.0 and the LSI value after the adding step is at least two times the LSI value before the adding step without any scale formation.

6. The method of claim 4 wherein the LSI value prior to the adding step is 0.2 to 1.0.

7. The method of claim 2 wherein the second phosphonic acid is PBTC or its water soluble salt.

8. The method of claim 1 wherein the second phosphonic acid is a phosphonocarboxylic acid or its water soluble salt.

9. The method of claim 8 wherein the adding step provides (1) an active concentration of 3 ppm-30 ppm of the amino-acid based polymer or its water soluble salt, an active concentration of 2 ppm-20 ppm of the hydroxyphosphonoacetic acid or it water soluble salt, and an active concentration of 1.5 ppm-10 ppm of the phosphonocarboxylic acid or its water soluble salt in the volume of water in the water system to inhibit scale or (2) an active concentration of 5 ppm-30 ppm amino-acid based polymer or its water soluble salt, an active concentration of 3 ppm-20 ppm of the hydroxyphosphonoacetic acid or its water soluble salt, and an active concentration of 2 ppm-10 ppm of the phosphonocarboxylic acid or its water soluble salt in the volume of water in the water system to inhibit corrosion.

10. The method of claim 1 wherein the second phosphonic acid is a phosphonocarboxylic acid or its water soluble salt;
the amino-acid based polymer or its water soluble salt, and hydroxyphosphonoacetic acid or its water soluble salt, and phosphonocarboxylic acid or its water soluble salt, and a tracer are combined in a treatment composition that does not contain tin prior to addition to the water system and wherein the method further comprises:
periodically measuring the amount of treatment composition in the water system based on a measurement of the tracer.

11. The method of claim 10 further comprising adding additional treatment composition as needed to maintain a concentration of the amino-acid based polymer or its water soluble salt of at least 2 ppm and a concentration of the hydroxyphosphonoacetic acid or its water soluble salt of at least 2 ppm, wherein these concentrations are when added to a volume of water in the water system to inhibit scale.

12. The method of claim 1 wherein the water in the water system contains a biocide.

13. The method of claim 12 wherein the biocide contains chlorine or bromine.

14. The method of claim 12 wherein the second phosphonic acid is HEDP or its water soluble salt and wherein no tin is added to the water system.

15. The method of claim 14 wherein the biocide contains chlorine or bromine.

16. The method of claim 1 wherein the water in the water system has a pH of 7-9.

17. The method of claim 1 wherein the water system is a recirculating water system having water with an LSI value of greater than 0 before the adding step and wherein the cycles of concentration are increased after the adding step.

18. The method of claim 17 wherein the second phosphonic acid is (1) PBTC or its water soluble salt or (2) HEDP or its water soluble salt; and wherein the cycles of concentration are increased to greater than 4.

19. The method of claim 17 wherein the second phosphonic acid is (1) PBTC or its water soluble salt or (2) HEDP or its water soluble salt; and wherein the cycles of concentration are increased to at least 6.

20. The method of claim 1 wherein no tin is added to the water system.

21. The method of claim 1 wherein the amino-acid based polymer is polyaspartic acid or its water soluble salt and the second phosphonic acid is PBTC or its water soluble salt.

22. The method of claim 21 wherein the water in the water system has an LSI value of greater than 0 before the adding step and wherein the cycles of concentration are increased after the adding step.

23. The method of claim 22 wherein the cycles of concentration increased by at least 1.

24. The method of claim 21 wherein no tin is added to the water system.

25. The method of claim 1 wherein the adding step provides an active concentration of 3 ppm-10 ppm of the amino-acid based polymer or its water soluble salt, an active concentration of 3 ppm-7.5 ppm of the hydroxyphosphonoacetic acid or its water soluble salt, and an active concentration of 3 ppm-4.8 ppm of the second phosphonic acid or its water soluble salt in the volume of water in the water system to inhibit corrosion.

26. A method of treating a recirculating cooling water system to inhibit corrosion on water system components made of aluminum and its alloys, copper and its alloys, zinc and its alloys, lead, or ferrous metals other than galvanized steel or any combination thereof and to inhibit scale over a range of LSI values of −2.5 to 3, the method comprising adding an amount of a polyaspartic acid or its water soluble salt, hydroxyphosphonoacetic acid or its water soluble salt, and an HEDP or its water soluble salt to the water in the water system; and
wherein the adding step provides (1) an active concentration of 2 ppm-50 ppm of the polyaspartic acid or its water soluble salt, an active concentration of 2 ppm-50 ppm of the hydroxyphosphonoacetic acid or its water soluble salt, and an active concentration of 1.5 ppm-20 ppm of the HEDP or its water soluble salt in the volume of water in the water system to inhibit scale or (2) an active concentration of 3 ppm-50 ppm, of the polyaspartic acid or its water soluble salt, an active concentration of 3 ppm-50 ppm of the hydroxyphosphonoacetic acid or its water soluble salt, and an active concentration of 2 ppm-20 ppm of the HEDP or its water soluble salt to inhibit corrosion; and
wherein the adding step provides an active polyaspartic acid or its water soluble salt that is (1) equal to or greater than an active amount of the hydroxyphosphonoacetic acid or its water soluble salt and (2) equal to or greater than an active amount of the HEDP or its water soluble salt; and
wherein no zinc or molybdenum or compounds containing zinc or molybdenum are added to the water in the water system.

27. The method of claim 26 wherein the water has an LSI value of greater than 0 before the adding step and wherein the cycles of concentration are increased after the adding step.

28. The method of claim 27 wherein the cycles of concentration increased by at least 1.

29. The method of claim 26 wherein no tin is added to the water system.

30. A method of treating a recirculating water system to inhibit scale formation, the method comprising adding an amount of an amino-acid based polymer or its water soluble salt, a hydroxyphosphonoacetic acid (HPA) or its water soluble salt, and a second phosphonic acid or its water soluble salt to the water in the water system; and
increasing an LSI value of the water after the adding step compared to an LSI value of the water prior to the adding step without scale formation; and
wherein the LSI value prior to the adding step is 0.2 to 3.0;
wherein the adding step provides an active concentration of at least 2 ppm of the amino-acid based polymer or its water soluble salt, an active concentration of at least 2 ppm of the hydroxyphosphonoacetic or its water soluble salt, and an active concentration of at least 1.5 ppm of the second phosphonic acid or its water soluble salt, and a total active concentration of the amino-acid based polymer or its water soluble salt, the hydroxyphosphonoacetic acid or its water soluble salt, and the second phosphonic acid or its water soluble salt of 6.5 ppm to 18.7 ppm in the volume of water in the water system; and wherein the adding step provides an active amount of amino-acid based polymer or its water soluble salt that is (1) equal to or greater than an active amount of the hydroxyphosphonoacetic acid or its water soluble salt and (2) equal to or greater than an active amount of the second phosphonic acid or its water soluble salt;

wherein no zinc or molybdenum or compounds containing zinc or molybdenum are added to the water in the water system; and at least one of the following: (1) wherein the amino-acid based polymer is polyaspartic acid or its water soluble salt and the second phosphonic acid is HEDP or its water soluble salt; or (2) wherein the cycles of concentration are increased to at least 4 after the adding step.

31. The method of claim 30 wherein the second phosphonic acid is a phosphonocarboxylic acid or its water soluble salt.

32. The method of claim 30 wherein no tin is added to the water in the water system.

33. The method of claim 32 wherein the cycles of concentration are increased after the adding step.

34. The method of claim 33 wherein the cycles of concentration are increased by at least 1.

35. The method of claim 33 wherein the cycles of concentration are increased by at least 2.

36. The method of claim 30 wherein the cycles of concentration are increased by at least 1.

37. The method of claim 30 wherein the cycles of concentration are increased by at least 2.

38. The method of claim 30 wherein the second phosphonic acid is a HEDP or its water soluble salt; and wherein the adding step provides a total active concentration of the amino-acid based polymer or its water soluble salt, HPA or its water soluble salt, and HEDP or its water soluble salt of 6.5 ppm to 13.4 ppm when added to a volume of water in the water system.

39. The method of claim 30 wherein the amino-acid-based polymer is polyaspartic acid or its water soluble salt and the second phosphonic acid is PBTC or its water soluble salt.

40. The method of claim 39 wherein the cycles of concentration are increased after the adding step.

41. The method of claim 40 wherein the cycles of concentration are increased by at least 1.

42. The method of claim 40 wherein the cycles of concentration are increased by at least 2.

43. The method of claim 30 wherein the second phosphonic acid is a PBTC or its water soluble salt; and wherein the adding step provides a total active concentration of the amino-acid based polymer or its water soluble salt, PBTC or its water soluble salt, and HPA or its water soluble salt of 6.5 ppm to 13.6 ppm when added to a volume of water in the water system.

44. The method of claim 30 wherein the water system is a recirculating water system;
wherein the second phosphonic acid is (1) PBTC or its water soluble salt or (2) HEDP or its water soluble salt; and
wherein the cycles of concentration are increased to greater than 4 after the adding step.

45. The method of claim 30 wherein the water system is a recirculating water system;
wherein the second phosphonic acid is (1) PBTC or its water soluble salt or (2) HEDP or its water soluble salt; and
wherein the cycles of concentration are increased to at least 6 after the adding step.

46. A method of treating a water system to inhibit scale when the water has an LSI value of greater than 0 to 3, the method comprising adding an amount of an amino-acid based polymer or its water soluble salt, hydroxyphosphonoacetic acid or its water soluble salt, and a second phosphonic acid or its water soluble salt to the water in the water system; and
wherein the adding step provides (1) concentration of 3 ppm-30 ppm of the amino-acid based polymer or its water soluble salt, an active concentration of 2 ppm-20 ppm of the hydroxyphosphonoacetic acid or it water soluble salt, and an active concentration of 1.5 ppm-10 ppm of the second phosphonic acid or its water soluble salt in the volume of water in the water system to inhibit scale;
wherein no tin or zinc or molybdenum or compounds containing zinc or molybdenum are added to the water system; and
at least one of the following: (1) wherein the second phosphonic acid is not a PBTC or its water soluble salt or (2) wherein the amino-acid based polymer is polyaspartic acid or its water soluble salt and the second phosphonic acid is HEDP or its water soluble salt.

47. The method of claim 46 wherein the adding step provides an active amount of amino-acid based polymer or its water soluble salt that is (1) equal to or greater than an active amount of the hydroxyphosphonoacetic acid or its water soluble salt and (2) equal to or greater than an active amount of the second phosphonic acid or its water soluble salt.

48. The method of claim 46 wherein the second phosphonic acid is HEDP or its water soluble salt and wherein the water in the water system contains a biocide.

49. The method of claim 48 wherein the biocide contains chlorine or bromine.

50. The method of claim 46 wherein the cycles of concentration are increased after the adding step.

51. The method of claim 50 wherein the cycles of concentration are increased by at least 1.

52. The method of claim 51 wherein the cycles of concentration are increased by at least 2.

* * * * *

UNITED STATES PATENT AND TRADEMARK OFFICE
CERTIFICATE OF CORRECTION

Page 1 of 3

PATENT NO. : 11,085,118 B2
APPLICATION NO. : 15/634416
DATED : August 10, 2021
INVENTOR(S) : Marta Drewniak and Lyle H. Steimel It is certified that error appears in the above-identified patent and that said Letters Patent is hereby corrected as shown below:

In the Claims

Column 18, Line 18 in Claim 1, "salt to the water in the water system" should read -- salt to water in the recirculating cooling water system --.

Column 18, Line 25 in Claim 1, "salt in the volume of water in the water system" should read -- salt in the water in the recirculating cooling water system --.

Column 18, Line 32 in Claim 1, "water soluble salt to inhibit corrosion" should read -- water soluble salt in the water in the recirculating cooling water system --.

Column 18, Lines 40-41 in Claim 1, "the water in the water system" should read -- the water in the recirculating cooling water system --.

Column 19, Lines 2-3 in Claim 9, "water soluble salt in the volume of water in the water system" should read -- water soluble salt in the water in the recirculating cooling water system --.

Column 19, Lines 9-10 in Claim 9, "water soluble salt in the volume of water in the water system" should read -- water soluble salt in the water in the recirculating cooling water system --.

Column 19, Lines 17-18 in Claim 10, "prior to addition to the water system" should read -- prior to addition to the recirculating cooling water system --.

Column 19, Line 21 in Claim 10, "in the water system" should read -- in the recirculating cooling water system --.

Column 19, Line 29 in Claim 11, "a volume of water in the water system" should read -- the water in the recirculating cooling water system --.

Signed and Sealed this
Fifteenth Day of April, 2025

Coke Morgan Stewart
*Acting Director of the United States Patent and Trademark Office*

CERTIFICATE OF CORRECTION (continued)

Column 19, Lines 30-31 in Claim 12, "water in the water system" should read -- water in the recirculating cooling water system --.

Column 19, Line 36 in Claim 14, "added to the water system" should read -- added to the recirculating cooling water system --.

Column 19, Lines 39-40 in Claim 16, "water in the water system" should read -- water in the recirculating cooling water system --.

Column 19, Lines 41-42 in Claim 17, "water system is a recirculating water system having water with an" should read -- water has an --.

Column 19, Line 43 in Claim 17, "wherein the" should read -- where a --.

Column 19, Lines 53-54 in Claim 20, "added to the water system." should read -- added to the recirculating cooling water system --.

Column 19, Line 58 in Claim 22, "the water in the water" should read -- the water in the recirculating cooling water --.

Column 19, Line 60 in Claim 22, "where the cycles" should read -- where a cycles --.

Column 19, Lines 64-65 in Claim 24, "added to the water system" should read -- added to the recirculating cooling water system --.

Column 20, Lines 5-6 in Claim 25, "soluble salt in the volume of water in the water system" should read -- soluble salt in the water in the recirculating cooling water system --.

Column 20, Lines 15-16 in Claim 26, "salt to the water in the water system" should read -- salt to water in the recirculating cooling water system --.

Column 20, Lines 23-24 in Claim 26, "soluble salt in the volume of water in the water system" should read -- soluble salt in the water in the recirculating cooling water system --.

Column 20, Line 30 in Claim 26, "water soluble salt to inhibit corrosion" should read -- water soluble salt in the water in the recirculating cooling water system to inhibit corrosion --.

Column 20, Lines 39-40 in Claim 26, "water in the water system" should read -- water in the recirculating cooling water system --.

Column 20, Line 43 in Claim 27, "the cycles" should read -- a cycles --.

Column 20, Lines 47-48 in Claim 29, "added to the water system" should read -- added to the recirculating cooling water system --.

CERTIFICATE OF CORRECTION (continued)
U.S. Pat. No. 11,085,118 B2

Column 21, Lines 2-3 in Claim 30, "in the volume of water in the water system" should read -- in the water in the recirculating water system --.

Column 21, Lines 11-12 in Claim 30, "added to the water in the water system" should read -- added to the water in the recirculating water system --.

Column 21, Line 17 in Claim 30, "where the cycles" should read -- where a cycles --.

Column 21, Line 23 in Claim 32, "water in the water system" should read -- water in the recirculating water system --.

Column 21, Lines 39-40 in Claim 38, "added to a volume of water in the water system" should read -- added to the water in the recirculating water system --.

Column 21, Line 41 in Claim 30, "amino-acid-based" should read -- amino-acid based --.

Column 21, Lines 55-56 in Claim 43, "added to a volume of water in the water system" should read -- added to the water in the recirculating water system --.

Column 22, Lines 1-2 in Claim 44, "The method of claim 30 wherein the water system is a recirculating water system;" should read -- The method of claim 30 --.

Column 22, Lines 8-9 in Claim 45, "The method of claim 30 where the water in the water system is a recirculating water system;" should read -- The method of claim 30 --.

Column 22, Line 15 in Claim 46, "when the water has" should read -- when water in the water system has --.

Column 22, Line 27 in Claim 46, "salt in the volume of water" should read -- salt in the water --.

Column 22, Line 50 in Claim 50, "wherein the cycles" should read -- wherein a cycles --.